United States Patent
Lim et al.

(10) Patent No.: US 8,885,333 B2
(45) Date of Patent: Nov. 11, 2014

(54) MOBILE TERMINAL

(75) Inventors: Seunggeun Lim, Seoul (KR); Kyuho Lee, Seoul (KR); Dongguk Kang, Seoul (KR); Zhimin Choo, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 202 days.

(21) Appl. No.: 13/470,060

(22) Filed: May 11, 2012

(65) Prior Publication Data
US 2013/0027892 A1 Jan. 31, 2013

(30) Foreign Application Priority Data
Jul. 25, 2011 (KR) .................. 10-2011-0073801

(51) Int. Cl.
| | |
|---|---|
| G06F 1/16 | (2006.01) |
| H05K 5/00 | (2006.01) |
| H05K 7/00 | (2006.01) |
| H05K 1/14 | (2006.01) |
| H05K 1/00 | (2006.01) |
| H05K 1/18 | (2006.01) |
| H05K 9/00 | (2006.01) |
| H04M 1/00 | (2006.01) |
| G09G 5/00 | (2006.01) |
| G06F 3/038 | (2013.01) |
| G02F 1/1333 | (2006.01) |
| H04M 1/18 | (2006.01) |
| H04M 1/02 | (2006.01) |
| B29L 31/34 | (2006.01) |
| B29K 705/00 | (2006.01) |
| B29C 45/14 | (2006.01) |

(52) U.S. Cl.
CPC ............ *H04M 1/185* (2013.01); *H04M 1/0266* (2013.01); *B29L 2031/3437* (2013.01); *H04M 1/0283* (2013.01); *H04M 1/0277* (2013.01); *B29K 2705/00* (2013.01); *B29C 45/14778* (2013.01)

USPC ............. 361/679.3; 361/679.21; 361/679.22; 361/679.24; 361/679.26; 361/679.55; 361/679.56; 361/736; 361/748; 361/752; 361/816; 361/818; 455/575.5; 455/575.7; 345/3.2; 345/204; 345/205; 349/56; 349/58; 349/59; 349/60

(58) Field of Classification Search
CPC ..... H05K 9/0073; H05K 5/04; H05K 5/0047; G06F 1/1626; G06F 1/1628; G06F 1/1656
USPC .......... 361/752, 748, 679.21, 679.22–679.29, 361/679.3, 679.55, 679.56, 736, 816, 818; 455/575.3–575.5, 575.7; 349/56–60; 345/3.2, 204, 205
See application file for complete search history.

(56) References Cited

U.S. PATENT DOCUMENTS

| | | | |
|---|---|---|---|
| 6,532,152 B1 * | 3/2003 | White et al. .................. | 361/692 |
| 2003/0050091 A1 * | 3/2003 | Tsai et al. ..................... | 455/556 |
| 2005/0146475 A1 * | 7/2005 | Bettner et al. ................ | 343/767 |
| 2007/0025072 A1 * | 2/2007 | Liao ............................. | 361/683 |
| 2010/0134963 A1 | 6/2010 | Suzuki et al. | |

FOREIGN PATENT DOCUMENTS

| | | |
|---|---|---|
| EP | 1612594 A1 | 1/2006 |
| EP | 1612594 A1 * | 1/2006 |
| EP | 1918800 A1 | 5/2008 |

* cited by examiner

*Primary Examiner* — Anthony Haughton
*Assistant Examiner* — Zhengfu Feng
(74) *Attorney, Agent, or Firm* — Birch, Stewart, Kolasch & Birch, LLP

(57) ABSTRACT

A mobile terminal includes a terminal body, a case defining an appearance of the terminal body, the case formed of a non-metal, and a metal frame formed of a metal, at least part of the metal frame extending through the case from inside to outside of the terminal body so as to be externally exposed, wherein the case and the metal frame are integrally formed with each other. Accordingly, a specific pattern can be realized at the appearance of the terminal body to arouse distinctive attraction to the appearance, thereby providing a terminal with such attractive appearance.

20 Claims, 7 Drawing Sheets

MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2011-0073801, filed on Jul. 25, 2011, the contents of which is incorporated by reference herein in its entirety.

BACKGROUND OF THE INVENTION

1. Field of the Invention

This specification relates to a mobile terminal, and particularly, to configurations of a case and a frame capable of supporting components installed in a mobile terminal.

2. Description of Related Art

As it becomes multifunctional, a terminal can be allowed to capture still images or moving images, play music or video files, play games, receive broadcast and the like, so as to be implemented as an integrated multimedia player.

Such terminals may be divided into mobile/portable terminals and stationary terminals according to their mobility. The mobile terminals can be easily carried and have one or more of functions such as supporting voice and video telephony calls, inputting and/or outputting information, storing data and the like.

Various new attempts have been made for the terminals by hardware or software in order to implement and enhance such complicated functions. Especially, in view of manufacturing the mobile terminal, several approaches may be considered to distinguish an outer face of a case or the like so as to make an appearance of the mobile terminal more attractive and increase stiffness (rigidity).

BRIEF SUMMARY OF THE INVENTION

Therefore, an aspect of the detailed description is to provide a case for a mobile terminal having a more improved structure and combined functions by producing a case of the terminal using different materials.

To achieve these and other advantages and in accordance with the purpose of this specification, as embodied and broadly described herein, there is provided a mobile terminal including a terminal body, a case defining an appearance of the terminal body, the case formed of a non-metal, and a metal frame formed of a metal, at least part of the metal frame extending through the case from inside to outside of the terminal body so as to be externally exposed, wherein the case and the metal frame may be integrally formed with each other.

In one aspect of the detailed description, the externally exposed portion of the metal frame may have a specific pattern to define the appearance of the terminal together with the case.

In one aspect of the detailed description, the specific pattern may be a plurality of stripe patterns formed along one surface of the terminal body, and the patterns may be connected to each other within the case.

In one aspect of the detailed description, the metal frame may support a display module disposed on one surface thereof, and a circuit board may be disposed on another surface of the metal frame.

In one aspect of the detailed description, the mobile terminal may further include a shielding member to cover electrical elements mounted on the circuit board. The metal frame may include a through hole at a central portion thereof, and be formed along side surfaces of the terminal body. The shielding member may be coupled to the metal frame to cover at least part of the through hole.

In one aspect of the detailed description, the metal frame may be ground-connected to at least one of the display module or the circuit board, and the metal frame may operate as a part of ground of one of the ground-connected display module or circuit board.

In one aspect of the detailed description, the case may include an opening opened toward an outside of the body, and the metal frame may be formed to surround the opening.

In one aspect of the detailed description, a connector terminal may be located at the opening, so as to be electrically connected to a manipulation unit or an external interface.

In one aspect of the detailed description, an antenna may be disposed adjacent to one side within the terminal body, and configured to transmit and receive radio signals based on a part of the terminal body as a main radiation direction. Here, the metal frame may be formed to obscure other directions except for the part so as not to interfere with radiation efficiency of the antenna.

In one aspect of the detailed description, the metal frame may include a plurality of metal members, and at least one metal member may operate as a part of a radiation member of an antenna configured to transmit and receive radio signals.

In accordance with one exemplary embodiment, a mobile terminal may include a terminal body configured to receive a display module and a circuit board, a case defining an appearance of the terminal body, and a metal frame extending through the case from inside to outside of the terminal body to be externally exposed, the metal frame being formed integrally with the case, wherein at least part of the metal frame may extend into the case to support at least one of the display module or the circuit board.

In accordance with at least one exemplary embodiment, a mobile terminal can have an appearance with a specific pattern, which may arouse distinctive attraction from the appearance.

Also, a case and a frame of the terminal may be implemented using different types of materials, so as to increase stiffness of the case and provide a feeding or grounding structure to the frame to be used as a radiation member of an antenna.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention. In the drawings.

DETAILED DESCRIPTION OF THE INVENTION

Figure 1:
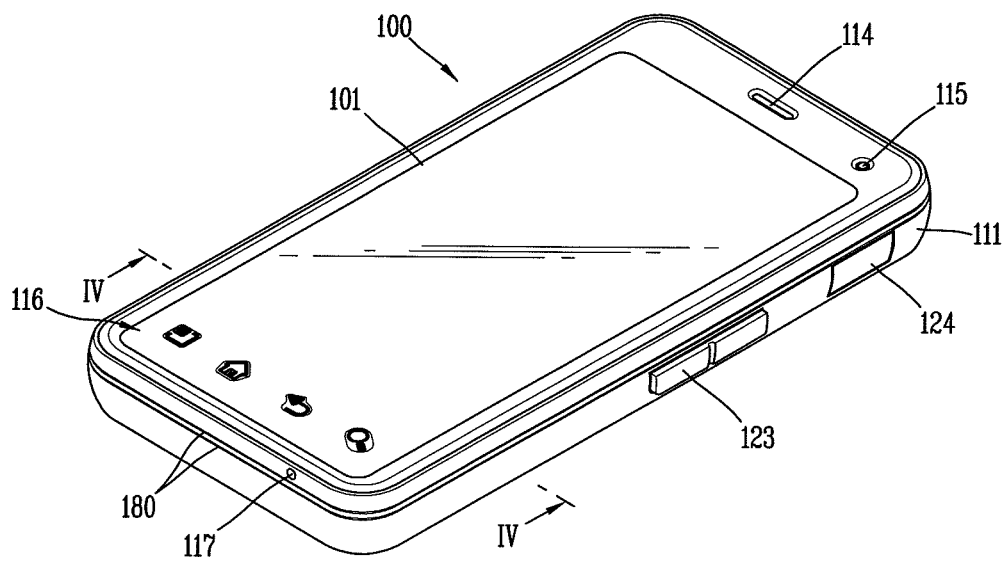
FIG. 1 is a front perspective view of a mobile terminal in accordance with one exemplary embodiment.

Description will now be given in detail of a mobile terminal according to the exemplary embodiments, with reference to the accompanying drawings. This specification employs like/similar reference numerals for like/similar components irrespective of different embodiments, so they all will be understood by the first description. The expression in the singular form in this specification will cover the expression in the plural form unless otherwise indicated obviously from the context.

Figure 2:
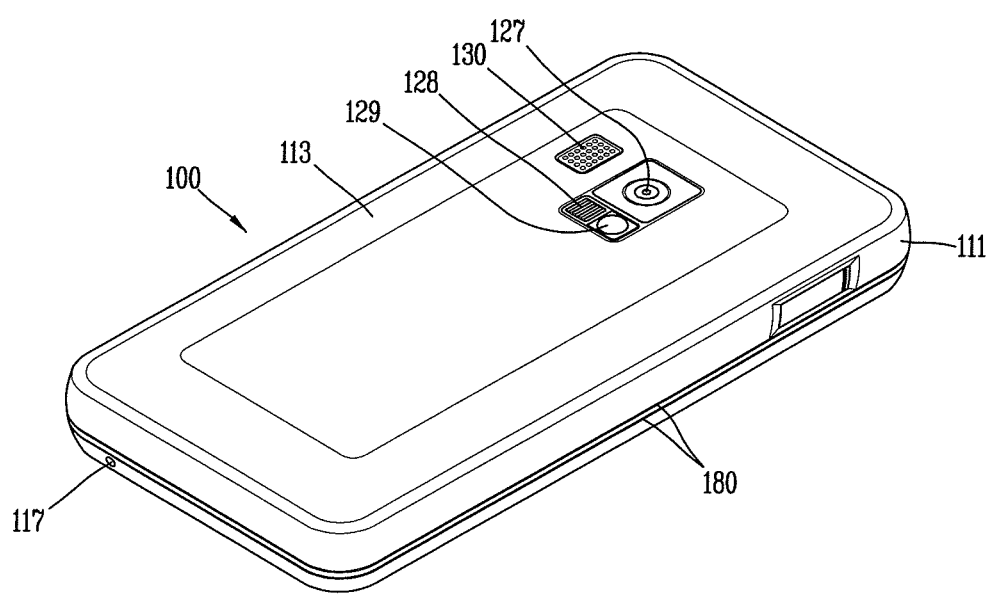
FIG. 2 is a rear perspective view of the mobile terminal.
Figure 3:
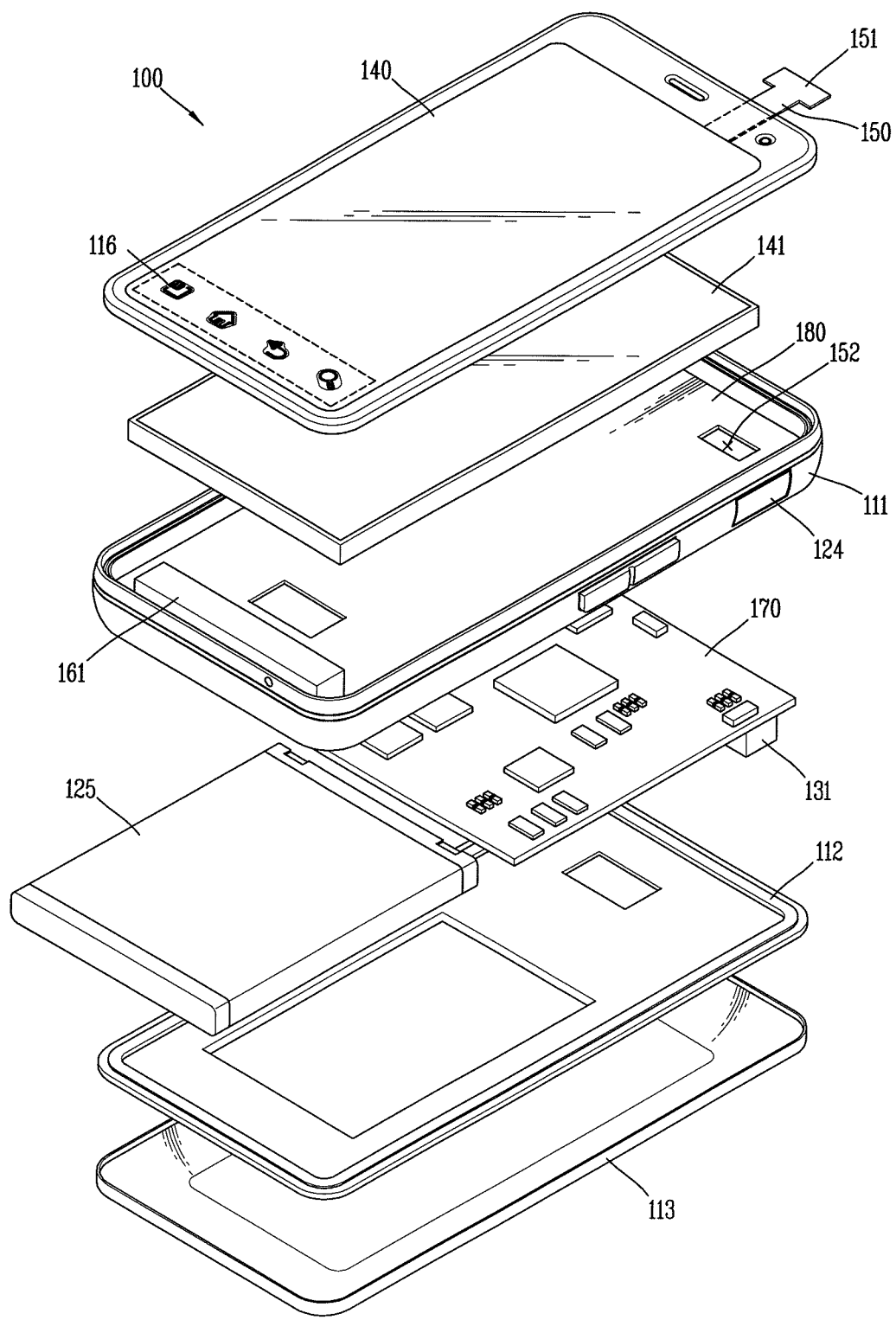
FIG. 3 is a disassembled perspective view of the mobile terminal of FIG. 1.

FIG. 1 is a front perspective view of a mobile terminal 100 in accordance with one exemplary embodiment, FIG. 2 is a rear perspective view of the mobile terminal 100 shown in FIG. 1, and FIG. 3 is a disassembled perspective view of the mobile terminal 100 shown in FIG. 1.

A case (casing, housing, cover, etc.) forming an outer appearance of the first body 110 may be formed from a front case 111 and a rear case 112. A space formed by the front case 111 and the rear case 112 may accommodate various components therein. At least one intermediate case may further be disposed between the front case 111 and the rear case 112. Such cases may be formed by injection-molded synthetic resin, or may be formed using a metallic material such as stainless steel (STS) or titanium (Ti). A battery cover 113 can also be used to cover the rear case 112 and other components as shown in FIGS. 2 and 3.

The front case 111 is shown having a display unit 101, a first audio output module 114, a first image input unit 115, a first manipulation unit 116, an audio input unit 117 and the like.

The display unit 101 may include a display module 141 (see FIG. 3), such as a Liquid Crystal Display (LCD) module, an Organic Light-Emitting Diode (OLED) module and the like to display visible information. The display unit 101 may be implemented as a touch screen so as to allow inputting of information by a user's touch.

The first audio output module 114 may include a receiver, a speaker or the like.

The first image input unit 115 may be a camera module for capturing images or video of the user and the like.

The first manipulation unit 116 may be manipulated to allow inputting of commands for controlling operations of the mobile terminal 100. The first manipulation unit 116 may be a key region formed to be sensitive to a touch input by a user on a window. Alternatively, the first manipulation unit 116 may be implemented by including a dome switch below the window to be pushed for inputting information.

The audio input unit 117 may be implemented, for example, as a type of microphone for receiving voice or other sounds input by the user.

The front case 111 of the mobile terminal 100 may further be provided with a second manipulation unit 123, an interface 124 and the like.

The second manipulation unit 123 may be installed at a side surface of the rear case 112. The first and manipulation units 116 and 123 may be referred to as a manipulating portion. Such manipulating portion can employ any tactile manner that a user can touch or tap for manipulation. For instance, the manipulating portion may be implemented as a dome switch, a touchpad or the like by which a user can input commands or information in a pushing or touching manner. Alternatively, the manipulating portion may be implemented as a wheel or a jog which rotates keys or a joystick.

From the functional perspective, the first manipulation unit 116 is configured to input commands such as START, END or the like, and the second manipulation unit 123 can be worked as a hot key which performs a specific function, such as activating of the first image input unit 115, as well as a scroll function. Upon employing at least the first and second manipulation units 116 and 123, inputting of telephone numbers or text messages may be executed using a touch screen disposed on the display unit 101.

The interface 124 may serve as a path for allowing data exchange between the mobile terminal and an external device. For example, the interface 124 may be at least one of wired/wireless earphone ports, ports for short-range communication (e.g., IrDA, Bluetooth, WLAN, etc.), power supply terminals for power supply to the mobile terminal and the like. The interface 124 may be a card socket for coupling to external cards, such as a Subscriber Identity Module (SIM), a User Identity Module (UIM), a memory card for storage of information and the like.

The power supply unit 125 may be provided at the rear case 112 to supply power to at least one component of the mobile terminal 100. The power supply unit 125, for example, may include a rechargeable battery for power supply.

As shown in FIGS. 2 and 3, the rear case 112 is shown having a second image input unit 127, a second audio output module 130, a broadcast signal receiving antenna 131 and the like. An additional antenna 161 as shown in FIG. 3 may also be included.

The second image input unit 127 faces a direction which is opposite to a direction faced by the first image input unit 115 (see FIG. 1), and may have different pixels from those of the first image input unit 115.

For example, the first image input unit 115 may operate with relatively lower pixels (lower resolution). Thus, the first image input unit 115 may be useful when a user can capture his face and send it to another party during a video call or the like. On the other hand, the second image input unit 127 may operate with relatively higher pixels (higher resolution) such that it can be useful for a user to obtain higher quality pictures for later use.

A flash 128 and a mirror 129 may additionally be disposed adjacent to the second image input unit 127. The flash 129 operates in conjunction with the second image input unit 128 when taking a picture using the second image input unit 127. The mirror 129 can cooperate with the second image input unit 127 to allow a user to photograph himself in a self-portrait mode.

The second audio output module 130 can cooperate with the first audio output module 114 (see FIG. 1) to provide stereo output. Also, the audio output module 130 may be configured to operate as a speakerphone.

A broadcast signal receiving antenna 131 may be disposed at one side of the rear case 112 in addition to an antenna 161 for communications. The antenna 131 may be drawn out of the rear case 112.

As described above, it has been described that the first manipulation unit 116 or the like is disposed at the front case 111 and the second manipulation unit 123 or the like is disposed at the rear case 112; however, the present disclosure may not be limited to the configuration. For example, the second manipulation unit 123 may be disposed at the front case 111 in the vicinity of the first manipulation unit 116. In addition, without the second image input unit 127, the first image input unit 115 can be implemented to be rotatable so as to rotate up to a direction which the second image input unit 127 faces.

As shown in FIG. 3, a window 140 may be coupled to obscure one surface of the front case 111. The window 140 may obscure a display module 141 such that visible information output on the display module 141 can be recognized from the exterior. The display module 141 and the window 140 may configure the display unit 101 (see FIG. 1).

The window 140 may be allowed for recognition of user's touch input and for inputting of information (commends, signals, etc.).

The window 140 may have an area corresponding to that of the display module 141. The window 140 may be formed of a transparent material. The window 140 may have a completely opaque area or an area with extremely low light transmittance. For example, edges of the window 140 may be surface-processed such that light cannot be transmitted therethrough.

The front case 111 may be provided with a manipulation pad corresponding to the first manipulation unit 116 (see FIG. 1). The manipulation pad is a target to be touched or pressed by a user. The manipulation pad may be formed as a manipulation area at a portion of the window 140.

The front case 111 may include a sound hole, a window hole and an image window.

The sound hole may be formed to correspond to the audio output module 114, such that sounds of the mobile terminal, for example, ringtone, music and the like can come therethrough. The window hole may be formed to correspond to the display unit 101. The transparent image window may be formed to correspond to the first image input unit 115 (see FIG. 1).

The rear case 112 is shown having a circuit board 170, a speaker module, a camera module, a switch and the like.

The circuit board 170 may be implemented as one example of a controller for running various functions of the mobile terminal 100. The circuit board 170 may detect an electrical change, which is generated due to a user's touch on the window 140, for example, a change in capacitance or the quantity of electric charges.

An electrode may be installed within the window 140. The electrode may be formed as a conductive pattern. The electrode may be charged with electric charges. When an electric conductor moves within a close distance, the quantity of electric charges being charged can change accordingly. When an electric conductor, for example, a user's finger touches the window, the quantity of electric charges being charged in the electrode may change, which is eventually the same as the change in capacitance between the finger and the electrode.

The electrode of the window 140 may be electrically connected to the controller, for example, the circuit board 170 for detecting changes in the quantity of electric charges. For the electrical connection, a flexible printed circuit board 150 may be connected to the circuit board 170 via a hole 152 (see FIG. 3). As the change in the quantity of electric charges is detected, the circuit board 170 may change a state of at least one function relating to the mobile terminal 100.

The flexible printed circuit board 150 may extend from one end of the window 140. A connecting portion 151 may be formed at one end of the flexible printed circuit board 150 to be connected to the electrode. The other end of the flexible printed circuit board 150 may be connected to the circuit board 170 via a connector. The connecting portion 151 may be formed of a metal so as to maintain a preset stiffness and elasticity.

Hereinafter, the exemplary embodiments of the present disclosure will be described with the accompanying drawings.

Referring to FIG. 3, the front case 111 may be formed to cover most of side surfaces of the terminal body. The front case 111 (hereinafter, merely referred to as 'case' for convenience explanation) may have a frame 180, which is formed of a metal and exposed into a specific pattern. FIG. 3 shows a plurality of stripe patterns as the specific pattern.

The pattern may be formed by an insert injection, by which the metal frame 180 is fixed in a mold and synthetic resin is injected into the mold to fabricate the case 111. The fabricated case 111 and metal frame 180 may experience a shape process such as a numerical control processing or a laser processing, so as to have curved surfaces as shown in FIG. 3.

The case 111 and the metal frame 180 may have an integrated structure, so as to be highly waterproof and have no concern about introduction of foreign materials into the terminal, as compared to a bonded structure of the case 111 and the metal frame 180.

Also, a metal with a specific level of intensity is added to synthetic resin which is slightly less durable or rigid, thereby increasing entire stiffness (rigidity) of the case 111. In addition, the case 111 is formed of an elastic member and the metal frame 180 is formed of a rigid metal, the case 111 capable of exhibiting a buffering effect and having a specific level of stiffness can be produced.

Figure 4:
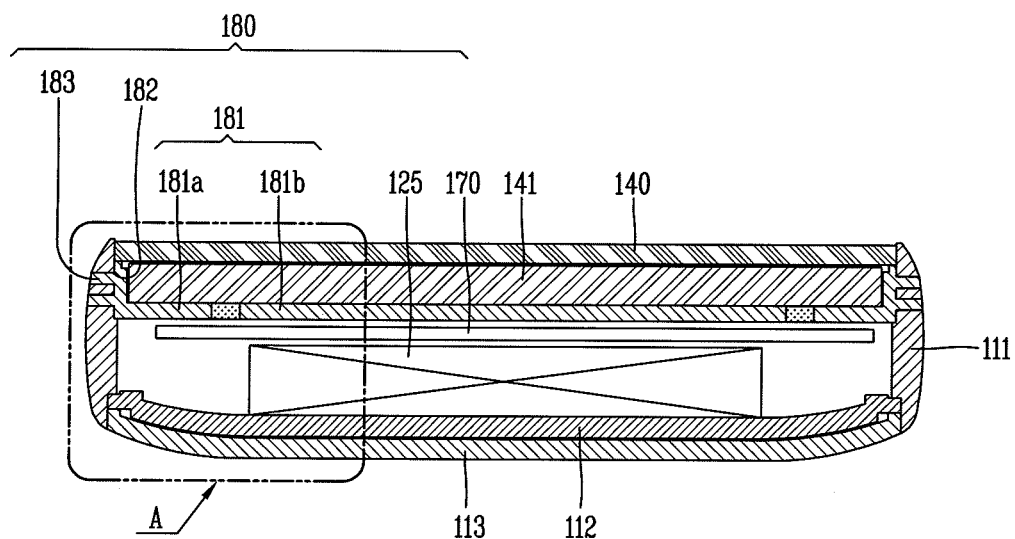
FIG. 4 is a sectional view taken along the line IV-IV of FIG. 1.
Figure 5:
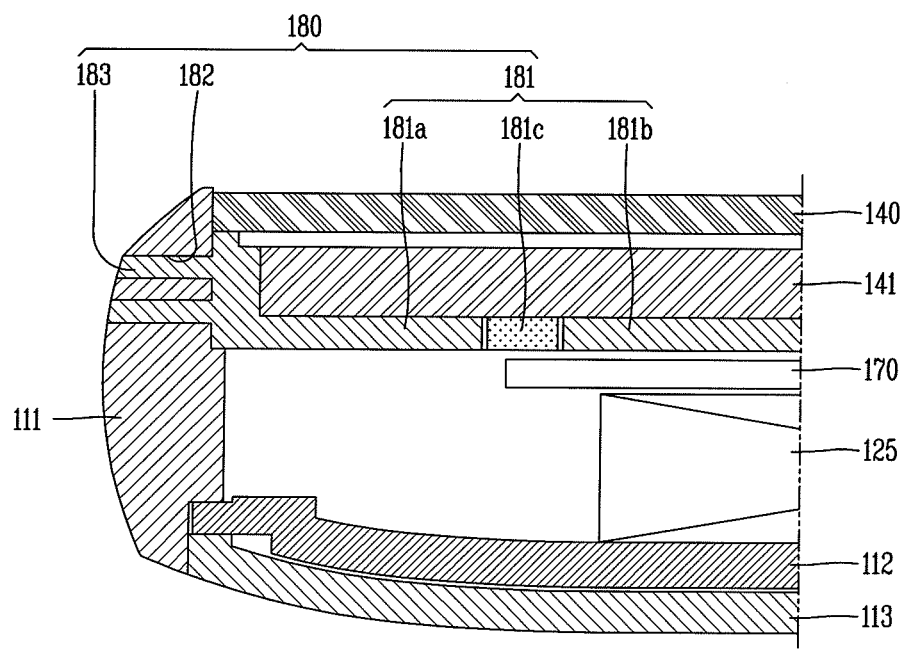
FIG. 5 is an enlarged view of a part A of FIG. 4.

FIG. 4 is a sectional view taken along the line IV-IV of FIG. 1, FIG. 5 is an enlarged view of a part A of FIG. 4, and FIGS. 6A to 6C are enlarged views of a part A of FIG. 4 in accordance with variations of a case.

As aforementioned, the metal frame 180 integrally fabricated with the case 111 may extend through the case 111 from inside to outside of the case 111. That is, the metal frame 180 penetrates through the case 111 formed of synthetic resin as a non-metal. Accordingly, the frame 180 can be integrally formed with the case 111 with being partially exposed to the outside. The metal frame 180 extending into the case 111 may cross an inner space of the terminal or only a part of the metal frame 180 may extend toward the inside of the terminal.

FIGS. 4 and 5 are sectional views in a state that the metal frame 180 is formed to cross the inner space of the terminal. The metal frame 180 may support a display module 141 disposed thereon. A circuit board 170 may be disposed on a lower surface of the metal frame 180 with being obscured by the metal frame 180.

A coupling portion 182 for allowing the metal frame 180 to be integrally coupled to the case 111 may be formed along edges of the body. An entire size of the coupling portion 182 may contribute to an increase in rigidity of the case 111.

One end of the coupling portion 182 corresponds to an exposed portion 183 extending through the case 111 to be exposed to the outside of the case 111. The exposed portion 183 is exposed outside the terminal, so it may be plated separately or coated with an oxide film to be distinctive from other parts. Besides, the exposed portion 183 may be made of a metal different from the coupling portion 182.

Especially, coating with the oxide film may be implemented by anodizing. The anodizing refers to forming an oxide on a surface of a metal to prevent oxidation from being performed any more in the air. The anodizing may be applied when a frame is made of a metal other than aluminum, which is so frail to be well corrosive due to oxidation.

A principal surface 181 of the metal frame 180 may be recessed into one surface of the metal frame 180. The display module 141 may be mounted on the recessed principal surface 181. Here, the metal frame 180 may be spatially divided into an area where the display module 141 is disposed and an area where the circuit board 170 and the like are disposed. Accordingly, electric elements, which are located on the circuit board 170 and associated with driving of the terminal, can be protected.

The metal frame 180 may operate as a ground of the display module 141 or the circuit board 170. Here, one end of the metal frame 180 may be ground-connected to one of the display module 141 or the circuit board 170.

The metal frame 180 may alternatively be ground-connected both to the display module 141 and the circuit board 170. Here, a frame body corresponding to the principal surface 181 of the metal frame 180 may be divided into a plurality, for example, first and second frame bodies 181a and 181b, which are then connected to the display module 141 and the circuit board 170, respectively. An insulating material 181c may be disposed between the first and second frame bodies 181a and 181b, thus to block a flow of electric power between the first and second bodies 181a and 181b, namely, block the flow of electric power transferred from the first frame body 181a to the second frame body 181b.

Figure 6A:
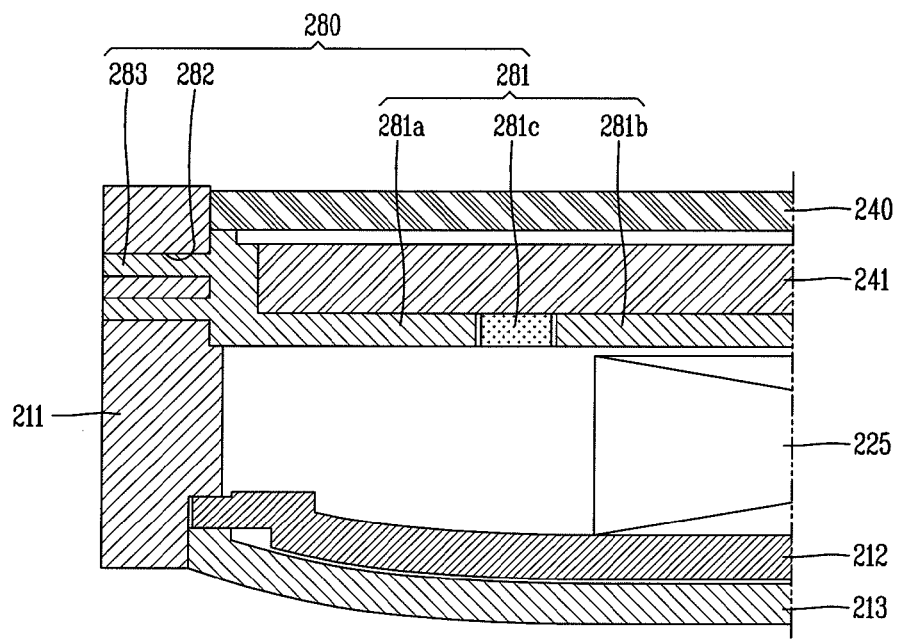
FIGS. 6A to 6C are enlarged views of a part A of FIG. 4 in accordance with variations of a case.

As shown in FIG. 5 and FIG. 6A, the case 111 and the metal frame 180, 280 may be processed to have a streamlined appearance at side surfaces of the terminal or make the side surfaces of the terminal angular. That is, the side surfaces of the terminal formed with the case 111, 211 and the metal frame 180, 280 may have more various appearances according to a cutting method or cutting level.

Figure 6B:
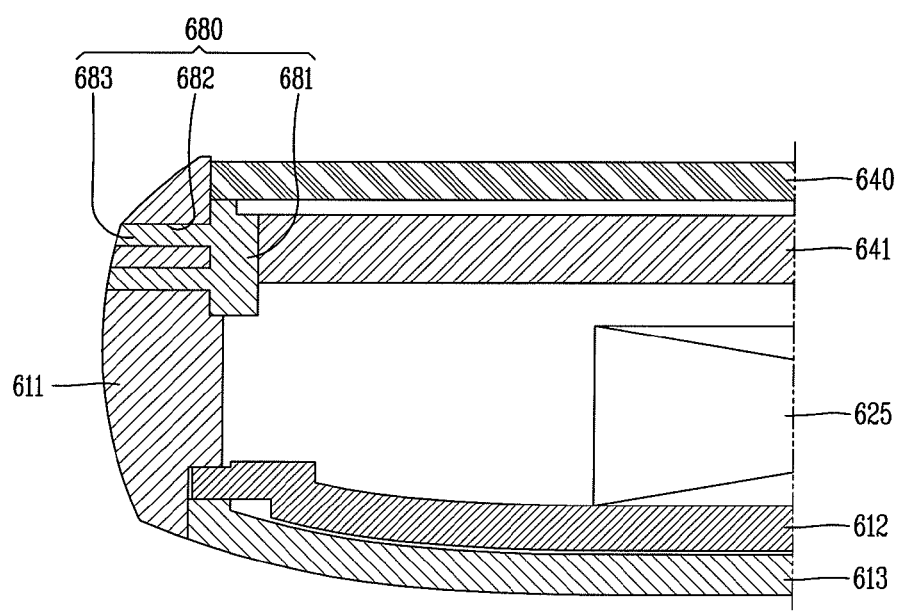
Figure 6C:
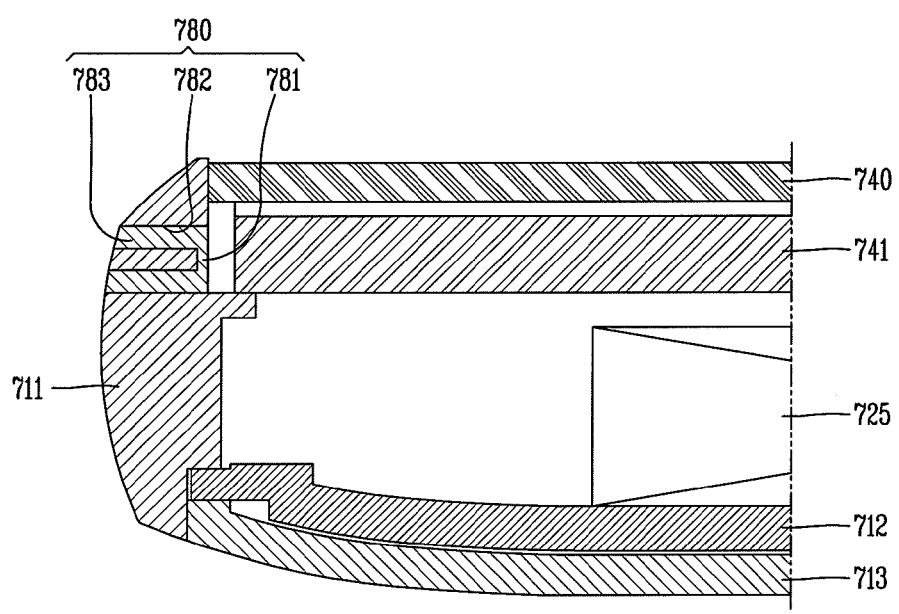

Also, as shown in FIGS. 6B and 6C, a case 611, 711 and a metal frame 680, 780 may be processed to be streamlined at side surfaces of the terminal, but unlike the structure shown in FIG. 5 and FIG. 6A, an internally extended portion of the metal frame 680, 780 may be formed without a principal surface. That is, according to the variations, the metal frame 680, 780 may be formed not to protrude into the inner space of the terminal.

Referring to FIG. 6B, the metal frame 680 may penetrate through the case 611 from inside to outside of the case 611. However, the metal frame 680 may not protrude into the inner space of the terminal, with merely supporting the side surfaces of the display module 641.

Referring to FIG. 6C, the metal frame 780 may be formed integrally with a case 711 without extending into the case 711. That is, the metal frame 780 may define a partition wall for limiting the inner space of the terminal together with the case 711. Here, a partially protruded portion of the case 711 may support the display module 741.

Figure 7:
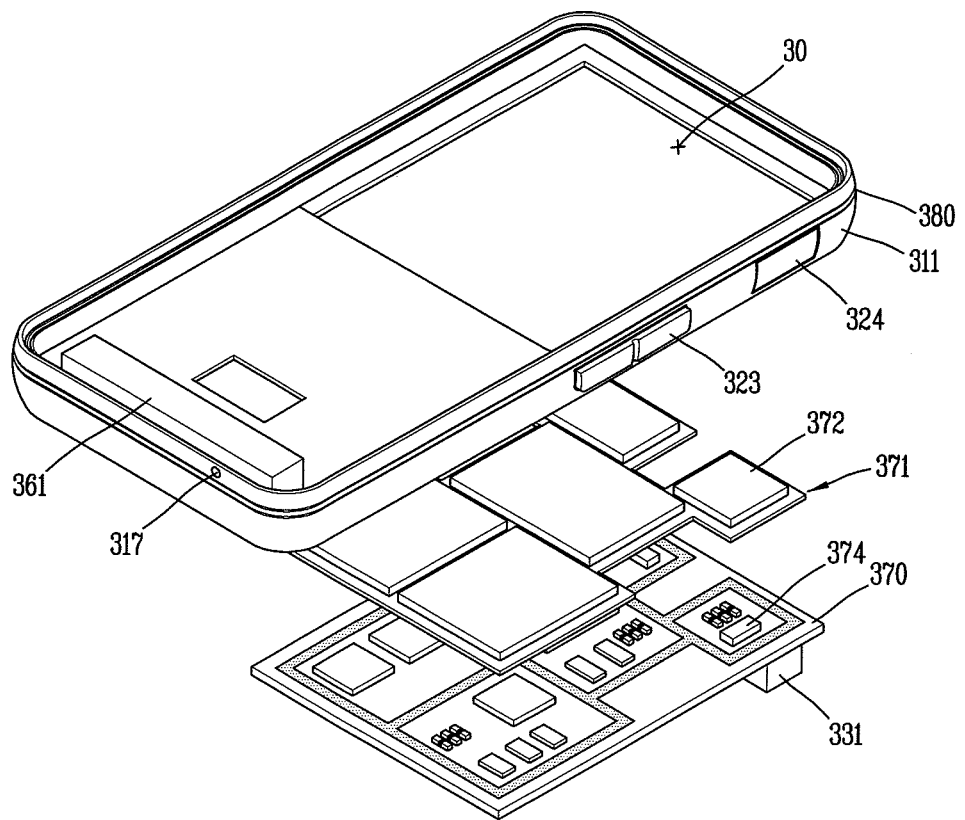
FIG. 7 is a perspective view showing a coupled state among a frame, a shielding member and a circuit board in association with one exemplary variation of a frame.

FIG. 7 is a perspective view showing a coupled state of a frame 380, a shielding member 371 and a circuit board 370 in accordance with one exemplary variation. As shown in FIG. 7, the metal frame 380 integrally formed with a case 311 may extend through the case 311 from inside to outside of the case 311. That is, the metal frame 380 penetrates through the case 311 made of synthetic resin as a non-metallic material, such that a part of the metal frame 380 may be exposed to the outside. The case 311 and the metal frame 380 may thusly be integrally formed.

The metal frame 380 extending into the case 311 may be formed to cross the inner space of the terminal or only a part of the metal frame 380 may extend to the inside of the terminal.

Unlike the aforementioned exemplary embodiments, the variation shows that a through hole 30, other than a recessed principal surface, is formed at a central portion of the metal frame 380. Also, the metal frame 380 may alternatively be formed such that the recessed principal surface is partially disposed and the through hole 30 is formed at another portion. When a shielding member 371 is coupled to the metal frame 380, protruding surfaces 372 of the shielding member 371 may cover at least part of the through hole 30. The shielding member 371 may cover and protect electrical elements disposed on one surface of a circuit board.

In general, the circuit board 370 of the mobile terminal may include electronic circuits mounted. The circuits may be sensitive to electromagnetic interference (EMI), and radio frequency interference (RFI). Especially, the RFI is generated from an interference source within the terminal or an external interference source. Hence, a shielding structure for blocking such interference and protecting electrical elements 374 is required. As one of the shielding structure, the shielding member 371 may be considered. The shielding member 371 may be made of stainless titanium for which plating is not needed. The shielding member 371 may be processed by a stage-based molding work using a pressing method.

Also, the shielding member 371 may cover the electrical elements 374 so as to improve a specific absorption rate (SAR). Antennas 361 and 331, manipulation portion 323, interface 324, audio input unit 317 and front case 311 are also shown in FIG. 7.

Figure 8:
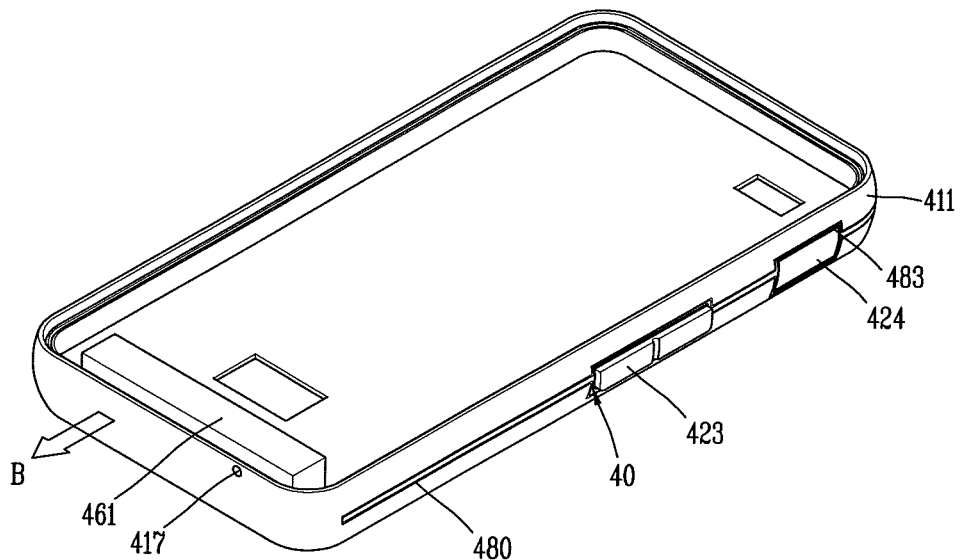
FIG. 8 is a perspective view showing a first exemplary variation of a case.

FIG. 8 is a perspective view showing a first exemplary variation of a case. As shown in FIG. 8, a metal frame 480 integrally fabricated with a case 411 may extend through the case 411 from inside to outside of the case 411. That is, the metal frame 480 penetrates through the case 411 made of synthetic resin as a non-metallic material such that a part of the metal frame 480 may be exposed to the outside. The case 411 and the metal frame 480 may thusly be integrally formed.

The metal frame 480 extending into the case 411 may be formed to cross the inner space of the terminal or only a part of the metal frame 480 may extend to the inside of the terminal.

An antenna 461 for transmission and reception of radio signals of the terminal may be formed adjacent to an upper end or lower end of the terminal. However, when electrical elements are adjacent to the antenna 461 or a metallic member is located in a radiation direction of the antenna, radiation efficiency of the antenna may be lowered.

Hence, the metal frame 480 may not be disposed at the case 411 adjacent to the radiation direction of the antenna 461. That is, the metal frame 480 may preferably be disposed in another direction other than a main radiation direction B of the antenna 461.

In accordance with the exemplary variation, the metal frame 480 may be formed at both side surfaces and an upper end except for a lower end where the antenna 461 is located. Accordingly, the appearance of the terminal can be distinctive, namely, the terminal can have a specific pattern without affecting the performance of the antenna.

Referring to FIG. 8, the case 411 formed at side surfaces of the terminal body may include an opening 40 open toward the outside of the body. An exposed portion 483 of the metal frame 480 may surround the opening 40. A manipulation unit 423 or an interface 424 may be located at the opening 40. Accordingly, the terminal can have unique appearance. An audio input unit 417 is also shown in FIG. 8.

Figure 9:
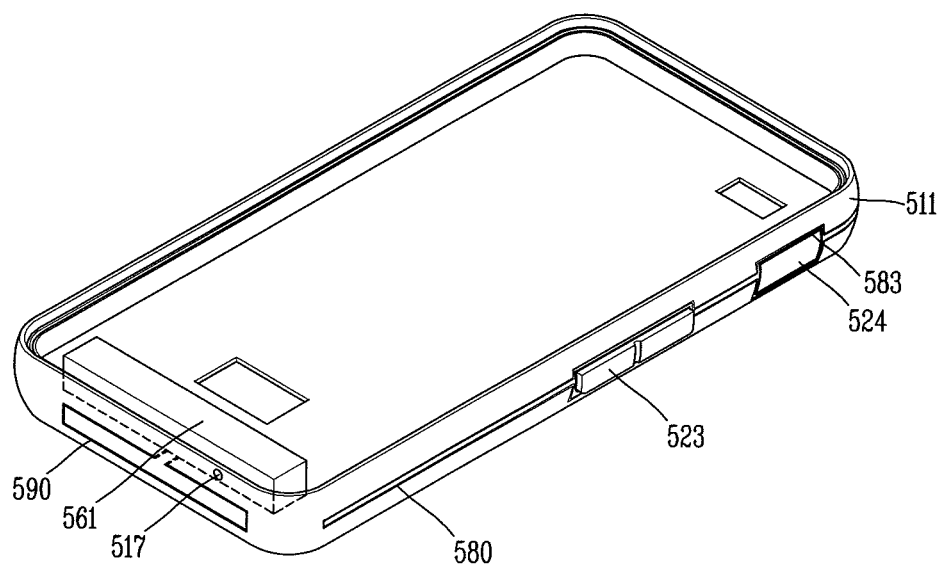
FIG. 9 is a perspective view showing a second exemplary variation of the case.

FIG. 9 is a perspective view showing a second exemplary variation of a case. As shown in FIG. 9, a metal frame 580 integrally formed with a case 511 may extend through the case 411 from inside to outside of the case 511. That is, the metal frame 580 penetrates through the case 511 made of synthetic resin as a non-metallic material such that a part of the metal frame 580 may be exposed to the outside. The case 511 and the metal frame 580 may thusly be integrally formed.

The metal frame 580 extending into the case 511 may be formed to cross the inner space of the terminal or only a part of the metal frame 580 may extend to the inside of the terminal.

Unlike the first exemplary variation, another metal frame 590 may be formed at the case 511 adjacent to an antenna 561. The metal frame 590 may be electrically connected to the antenna 561 so as to work as a part of radiation member of the antenna 561.

In general, electrical elements are not mounted within a space where radiation efficiency of an antenna is interfered. However, when the metal frame 590 is formed at the case 511, which is formed along side surfaces of a terminal body, and the metal frame 590 is used as a part of a radiation member of the antenna, the electrical elements may be mounted adjacent to the antenna so as to reduce lowering of operation efficiency, which results in efficient use of the inner space of the terminal.

According to the exemplary variation, the metal frames 580 and 590 may be formed in plurality and one (e.g., 590) of the metal frames 580 and 590 can be used as a radiation member of the antenna. Hence, the metal frames 580 and 590 may provide unique attraction to the outer appearance and improve performance of the terminal. In addition, the case 511 formed at the side surface of the terminal body may include an opening opened to the outside of the terminal body. The metal frame 580, namely, an exposed portion 583 of the metal frame 580 may surround the opening. A manipulation unit 532 or an interface 524 may be located at the opening.

Unlike the aforementioned exemplary embodiments, the metal frame 180, 280, 380, 480, 580, 680, 780 may be partially or entirely formed inside the case without being externally exposed. In this structure, the metal frame may increase stiffness of the case and implement a unique pattern on an appearance of the terminal. An audio input unit 517 is also shown in FIG. 9.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a terminal body defining an interior space and having an exterior;
a case defining an appearance of the terminal body, the case formed of a non-metal and having side surfaces; and
a metal frame supporting a display module and having at least two protruding portions extending from the interior space and through the side surfaces of the case to the exterior of the terminal body so the at least two protruding portions form a pattern on an exterior surface of the case,
wherein the case and the metal frame are integrally formed together.

2. The terminal of claim 1, wherein the pattern formed by the at least two protruding portions is a stripe pattern.

3. The terminal of claim 2, wherein the at least two protruding portions are connected to each other within the case.

4. The terminal of claim 1, wherein the metal frame supports the display module disposed on one surface and a circuit board disposed on another surface thereof.

5. The terminal of claim 4, further comprising a shielding member to cover electrical elements mounted on the circuit board,
wherein the metal frame comprises a through hole at a central portion thereof, and
wherein the shielding member is coupled to the metal frame to cover at least part of the through hole.

6. The terminal of claim 4, wherein the metal frame is connected to at least one of the display module and the circuit board to operate as part of a ground for said at least one of the display module and the circuit board.

7. The terminal of claim 6, wherein the metal frame includes a first frame member, a second frame member and an insulating member connecting the first frame member to the second frame member.

8. The terminal of claim 7, wherein the display module is connected to one of the first and second frame members and the circuit board is connected to the other of the first and second frame members.

9. The terminal of claim 1, wherein the case comprises an opening opened toward the exterior of the terminal body, and
wherein a portion of the metal frame is formed to surround the opening.

10. The terminal of claim 9, wherein a connector terminal is located at the opening, the connector terminal being electrically connected to one of a manipulation unit and an external interface of the terminal body.

11. The terminal of claim 1, wherein an antenna is disposed adjacent to one side of the terminal body within the terminal body, the antenna be configured to transmit and receive radio signals based on a portion of the terminal body defining a main radiation direction, and
wherein the metal frame is formed to obscure other radiation directions except for the portion of the terminal body defining the main radiation direction so as not to interfere with radiation efficiency of the antenna.

12. The terminal of claim 1, wherein the metal frame includes a plurality of metal members, at least one of the plurality of metal members operating as a part of a radiation member of an antenna configured to transmit and receive radio signals.

13. A mobile terminal comprising:
a terminal body defining an interior space and having an exterior, the interior space being configured to receive at least one of a display module and a circuit board;
a case defining an appearance of the terminal body; and
a metal frame supporting the display module and having at least two protruding portions extending from the interior space and through side surfaces of the case to the exterior of the terminal body so the at least two protruding portions form a pattern on an exterior surface of the case, the case and the metal frame being integrally formed together, wherein at least a portion of the metal frame extends into the case to support at least one of the display module and the circuit board.

14. The terminal of claim 13, wherein the pattern formed by the at least two protruding portions is a stripe pattern.

15. The terminal of claim 13, wherein the metal frame is connected to at least one of the display module and the circuit board to operate as part of a ground for said at least one of the display module and the circuit board.

16. The terminal of claim 15, wherein the metal frame includes a first frame member, a second frame member and an insulating member connecting the first frame member to the second frame member.

17. The terminal of claim 16, wherein the display module is connected to one of the first and second frame members and the circuit board is connected to the other of the first and second frame members.

18. The terminal of claim 13, wherein the case comprises an opening opened toward the exterior of the terminal body, and wherein a portion of the metal frame is formed to surround the opening.

19. The terminal of claim 18, wherein a connector terminal is located at the opening, the connector terminal being electrically connected to one of a manipulation unit and an external interface of the terminal body.

20. The terminal of claim 13, further comprising a shielding member to cover electrical elements mounted on the circuit board, wherein the metal frame comprises a through hole at a central portion thereof, and wherein the shielding member is coupled to the metal frame to cover at least part of the through hole.

* * * * *